United States Patent
Kurmala et al.

(10) Patent No.: US 11,528,166 B2
(45) Date of Patent: Dec. 13, 2022

(54) GEO-LOCATION BASED OPTIMIZED HUB MESH

(71) Applicant: HEWLETT PACKARD ENTERPRISE DEVELOPMENT LP, Houston, TX (US)

(72) Inventors: Hari Krishna Kurmala, Santa Clara, CA (US); Shreekanth Chandranna, Santa Clara, CA (US)

(73) Assignee: Hewlett Packard Enterprise Development LP, Spring, TX (US)

(*) Notice: Subject to any disclaimer, the term of this patent is extended or adjusted under 35 U.S.C. 154(b) by 69 days.

(21) Appl. No.: 17/147,089

(22) Filed: Jan. 12, 2021

(65) Prior Publication Data
US 2022/0224563 A1 Jul. 14, 2022

(51) Int. Cl.
*H04L 12/46* (2006.01)
*H04L 41/12* (2022.01)
(Continued)

(52) U.S. Cl.
CPC ...... *H04L 12/4633* (2013.01); *H04L 12/4641* (2013.01); *H04L 41/00* (2013.01);
(Continued)

(58) Field of Classification Search
None
See application file for complete search history.

(56) References Cited

U.S. PATENT DOCUMENTS

| | | | |
|---|---|---|---|
| 2008/0232379 A1* | 9/2008 | Mohamed | H04L 12/4679 370/395.53 |
| 2008/0259788 A1* | 10/2008 | Wang | H04W 40/24 370/328 |

(Continued)

OTHER PUBLICATIONS

Author Unknown, Hub and Spoke Network Topology, pp. 1-8, https://github.com/MicrosoftDocs/cloud-adoption-framework/blob/44eda7759ec6213169f08836968ad0f636d56501/docs/ready/azure-best-practices/hub-spoke-network-topology.md Nov. 19 (Year: 2020).*

(Continued)

*Primary Examiner* — Christopher M Crutchfield
(74) *Attorney, Agent, or Firm* — Sheppard Mullin Richter & Hampton LLP

(57) ABSTRACT

Systems, methods, and computer-readable media are described for establishing an optimized geo-location based hub mesh network for a group of network controllers spanning multiple regions, where the optimized mesh network includes substantially fewer connections between network controllers than conventional hub mesh networks. Geo-location information is obtained for the group of network controllers, and the network controllers are categorized into various physical regions based on the geo-location information. Then, within each region, a particular network controller is selected to serve as a primary regional hub for that region. Tunnel connections are then established between each non-hub network controller in each region and the primary regional hub for that region. In addition, tunnel connections are established between each non-hub network controller in a region and each other non-hub network
(Continued)

controller within the same region. Moreover, connections are established between the regional hub network controllers.

20 Claims, 6 Drawing Sheets

(51) Int. Cl.
*H04L 41/40* (2022.01)
*H04L 41/044* (2022.01)
*H04L 45/64* (2022.01)
*H04L 41/00* (2022.01)
*H04L 41/045* (2022.01)

(52) U.S. Cl.
CPC .......... *H04L 41/044* (2013.01); *H04L 41/045* (2022.05); *H04L 41/12* (2013.01); *H04L 41/40* (2022.05); *H04L 45/64* (2013.01)

(56) References Cited

U.S. PATENT DOCUMENTS

| | | | |
|---|---|---|---|
| 2013/0290704 A1* | 10/2013 | Giniger | H04L 63/0823 |
| | | | 713/156 |
| 2017/0005868 A1* | 1/2017 | Scheines | H04L 67/52 |
| 2018/0198694 A1* | 7/2018 | Wells | H04L 41/147 |
| 2021/0112036 A1* | 4/2021 | Hernandez | H04L 61/4552 |
| 2021/0168125 A1* | 6/2021 | Vemulpali | H04L 2101/622 |
| 2021/0377109 A1* | 12/2021 | Shrivastava | H04L 45/34 |

OTHER PUBLICATIONS

M. Behringer, A. Clemm, B. Carpenter, S. Jiang, L. Ciavaglia, Autonomic Networking: Definitions and Design Goals, pp. 1-18 (Year: 2015).*

Author Unknown, Typical VPN Topologies, Site:Http://etutorials.org/Networking/MPLS+VPN+Architectures/Part+2+MPLS-based+Virtual+Private+Networks/Chapter+7.+Virtual+Private+Network+VPN+Implementation+Options/Typical+VPN+Network+Topologies/, pp. 1-10 (Year: 2018).*

* cited by examiner

GEO-LOCATION BASED OPTIMIZED HUB MESH

DESCRIPTION OF RELATED ART

In a traditional hub mesh network, each network controller (e.g., virtual private network controller (VPNC)) establishes connectivity to other each other network controller to create the mesh network. However, as the number of network controllers increases, the size of the mesh (e.g., the number of connections between network controllers) grows exponentially. Thus, establishing and maintaining a traditional hub mesh network can quickly become resource and cost intensive.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
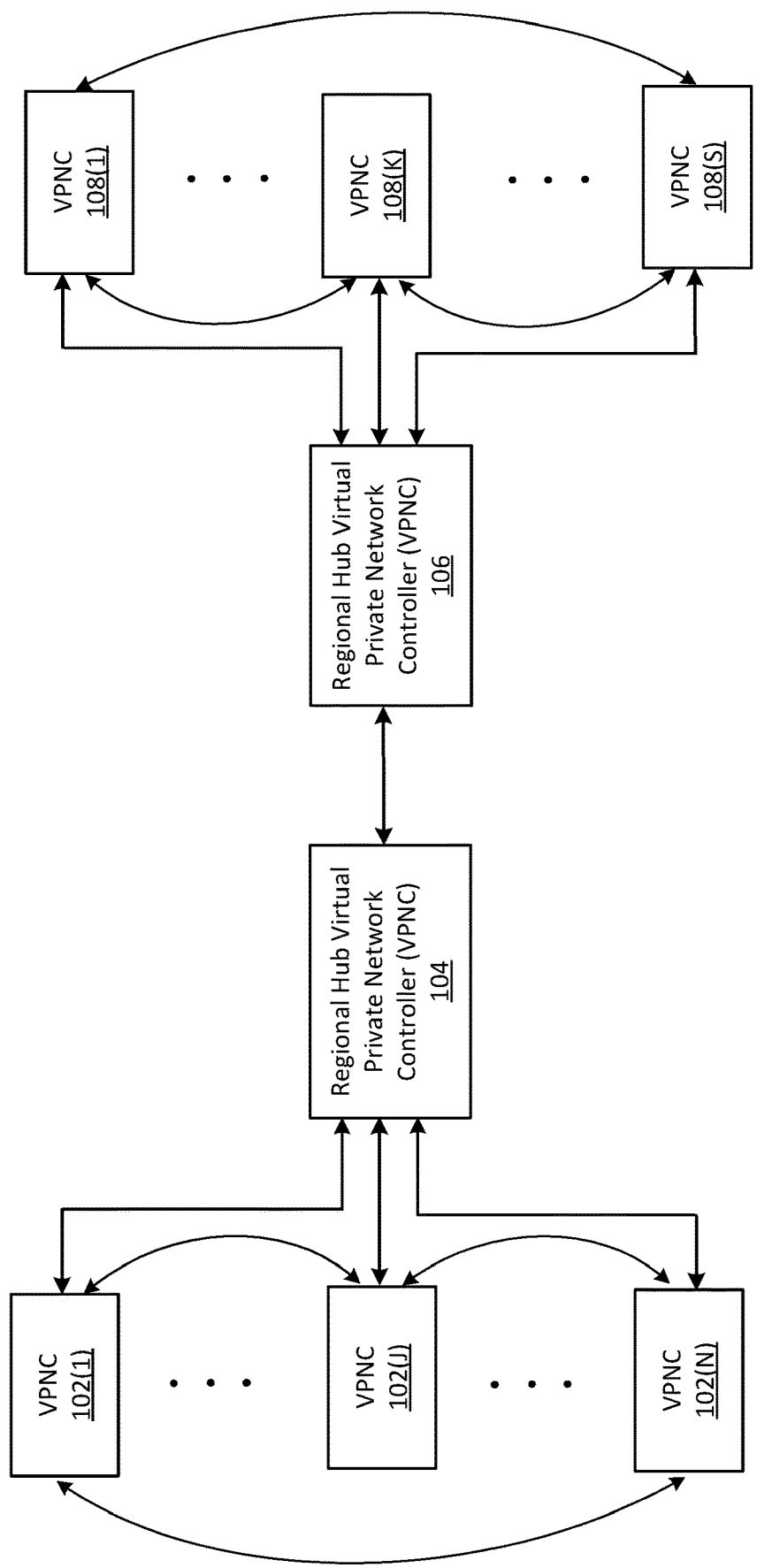
FIG. 1 is a schematic diagram of an optimized geo-location based hub mesh network according to example embodiments of the invention.

The figures are not exhaustive and do not limit the present disclosure to the precise form disclosed.

DETAILED DESCRIPTION

Example embodiments of the invention relate to, among other things, systems, methods, computer-readable media, techniques, and methodologies for establishing an optimized geo-location based hub mesh network for a group of network controllers spanning multiple regions. In example embodiments, the network controllers may be virtual private network controllers (VPNCs). In example embodiments, geo-location information may be obtained for a group of network controllers, and the network controllers may be categorized into various physical regions based on the geo-location information. Then, within each region, a particular network controller may be selected to serve as a regional hub for that region.

Various criteria may be evaluated to select a particular network controller within a region to serve as a hub for that region. For instance, for those network controllers for which it is available, model information may be obtained including, for example, a model name and/or SKU details. In those cases where model information may not be available, a performance rating/score may be calculated for a network controller based on performance specification information obtained for the network controller. The performance specification information may include, for example, CPU type and speed, memory type and amount, platform type, and so forth. In example embodiments, the network controllers within a given region may be ranked based on their model information and/or performance scores calculated based on performance specification information. In example embodiments, a top-ranked network controller may be selected as a primary regional hub for the region. A corresponding primary regional hub may be similarly determined for each region. Further, in some example embodiments, a next highest-ranked network controller may be selected as a secondary regional hub. The secondary regional hub may be selected to take over the role of the primary regional hub in the event that the primary regional hub fails. Failure of the primary regional hub may include, without limitation, the primary regional hub not being reachable (e.g., a timeout condition), the primary regional hub being down (e.g., planned system maintenance, an expected system outage, etc.), or the like. Moreover, if a primary hub fails and the secondary regional hub now becomes the primary hub, a new secondary regional hub may be selected based on the ranking. Further, as new network controllers are determined to have been added to a region, a re-ranking may be performed, and a new primary and/or secondary regional hub may be selected if the new controllers supplant the existing primary and/or secondary regional hubs in the re-ranking. For example, if a new network controller added to a region is associated with model information (e.g., a higher-ranked SKU) or a performance rating/score that is superior to a current primary regional hub or a current secondary regional hub, the new network controller may replace the existing hub network controller.

In example embodiments, the model information (e.g., SKUs) or the performance ratings/scores for various network controllers may reflect the scaling capabilities of the network controllers, which in turn, may determine how resource-intensive establishing the tunnel connections of the mesh network may be. More specifically, because the SKUs and the performance ratings/scores are indicative of the computing/processing resources of the network controllers, they can be used to rank the network controllers in terms of their scaling capability, and thus, their suitability for serving as a regional hub for a group of network controllers within a region.

In example embodiments, each network controller within a given region may be informed of which network controller has been selected as a regional hub, and tunnel connections may be established between the regional hub network controller and each other network controller within the same region. In addition, connections would be established between each non-hub network controller within a given region and each other non-hub network controller within the same region as well as between the regional hubs for different regions. According to example embodiments, however, connections would not be required between a non-hub network controller in a first region and any network controller in any other region.

In this manner, because an optimized geo-location based hub mesh according to example embodiments can be established without requiring a non-hub network controller in a given region to be connected to any network controller in any other region, the number of connections required as compared to a traditional hub mesh network is substantially reduced. This, in turn, yields a technical solution to the problem of exponential growth in connections between network controllers that occurs in a traditional hub mesh network as the number of network controllers increases. This technical solution thus constitutes a technological improvement to hub mesh network technology.

Consider, for example, a scenario in which there are 3 data centers in each of regions A and B and 2 data centers in each of regions C and D. Thus, there are 10 VPNCs across all regions in this example. In a traditional hub mesh network, the number of connections required between the VPNCs is given by $(N*(N-1))/2$, where N is the number of VPNCs, which in this example would yield 45 connections. In contrast, according to the techniques described herein for establishing an optimized geo-location based hub mesh network, the number of connections required would only be 13. Moreover, as an organization grows and their regional presence expands, the reduction in connections required for an optimized geo-location based hub mesh according to example embodiments of the invention becomes even more significant. For instance, assume in the above example that an additional 10 VPNCs are added across the various regions as follows: 3 more in each of regions A and B and 2 more in each of regions C and D. For a traditional hub mesh network, the number of connections required would now be $20*19/2=190$ connections. In contrast, for an optimized geo-location based hub mesh network in accordance with example embodiments of the disclosure, the number of connections would be 47. This difference in the number of connections grows exponentially as the number of network controllers increases.

Referring now to illustrative embodiments of the invention, FIG. 1 depicts a schematic diagram of an optimized geo-location based hub mesh network according to example embodiments of the invention. While FIG. 1 illustratively depicts VPNCs and various example embodiments are described herein in connection with VPNCs, it should be appreciated that embodiments of the invention are applicable to mesh-type networks that include peer-to-peer connections between any type of network controller or network device generally. As depicted in FIG. 1, a first set of VPNCs 102(1)-102(N) (where N is any integer greater than 1) may form part of a first region and a second set of VPNCs 108(1)-108(S) (where S is any integer greater than 1) may form part of a second different region. In example embodiments, the first and second regions may be physical, geographic regions defined by physical boundaries. While only two regions are illustratively depicted in FIG. 1, it should be appreciated that any number of regions of VPNCs may be provided and that each region may include any number of constituent VPNCs.

In example embodiments, the first set of VPNCs 102(1)-102(N) and the second set of VPNCs 108(1)-108(S) may have been categorized into the first and second regions, respectively, based on geo-location information obtained for the VPNCs. In some example embodiments, the VPNCs themselves may provide the geo-location information to a central controller (described in more detail later in this disclosure) and the central controller may be configured to determine which region each VPNC belongs to. The geo-location information may include, for example, an Internet Protocol (IP) address of a VPNC, Global Positioning System (GPS) coordinates indicative of a physical geographic location of the VPNC, a physical address of location at which the VPNC resides, or the like.

Once the respective regions for the VPNCs are determined, a particular VPNC may be selected in each region to serve as the regional hub for that region. For instance, the VPNC 104 may be selected from among the VPNCs 102(1)-102(N) to serve as the regional hub for the first region and the VPNC 106 may be selected from among the VPNCs 108(1)-108(S) to serve as the regional hub for the second region. Further, although not depicted in FIG. 1, it should be appreciated that another VPNC among the first set of VPNCs 102(1)-102(N) may be selected to serve as a secondary (backup) regional hub for the first region, and similarly, another VPNC among the second set of VPNCs 108(1)-108(S) may be selected to serve as a secondary (backup) regional hub for the second region. The secondary regional hub for the first region may become the primary regional hub for the first region in the event of failure of the VPNC 104, and similarly, the secondary regional hub for the second region may become the primary regional hub for the second region in the event of failure of the VPNC 106.

Each non-hub VPNC in each region may then be informed of the selected regional hub VPNC and provided with network routing information such as crypto-maps by a tunnel service to enable each non-hub VPNC within each region to establish a tunnel connection to the VPNC selected as the regional hub for that region. That is, each VPNC 102(1)-102(N) may establish a respective tunnel connection to the regional hub VPNC 104, and similarly, each VPNC 108(1)-108(S) may establish a respective tunnel connection to the regional hub VPNC 106. In addition, each non-hub VPNC within a given region may establish a tunnel connection to each other non-hub VPNC within the same region. For instance, as depicted in FIG. 1, VPNC 102(1) establishes a connection to VPNC 102(N), and each of VPNC 102(1) and VPNC 102(N) establishes respective connections to each other non-hub VPNC 102(J) in the same region (where J represents any integer between 1 and N). Similarly, VPNC 108(1) establishes a connection to VPNC 108(5), and each of 108(1) and 108(S) establishes respective connections to each other non-hub VPNC 102(K) in the same region (where K represents any integer between 1 and S). Moreover, the regional hub VPNC 104 establishes a connection to the regional hub VPNC 106. Similar connections would be established for any additional VPNC regions.

As noted earlier, however, in contrast to traditional hub mesh networks, none of VPNCs 102(1)-102(N) in the first region would need to establish a connection with any of VPNCs 108(1)-108(S) in the second region because of the connection that is established between the regional hub 104 of the first region and the regional hub 106 of the second region, which serves to link the first and second regions. As such, the number of connections required to establish the optimized geo-location based hub mesh network depicted in FIG. 1 is substantially less than the number of connections required for a traditional hub mesh network, thereby yielding a technical solution and technological improvement over conventional hub mesh networks. Further, this reduction in the number of connections required—and the resulting technical benefit—grows exponentially as the number of VPNCs/regions increases.

Figure 2A:
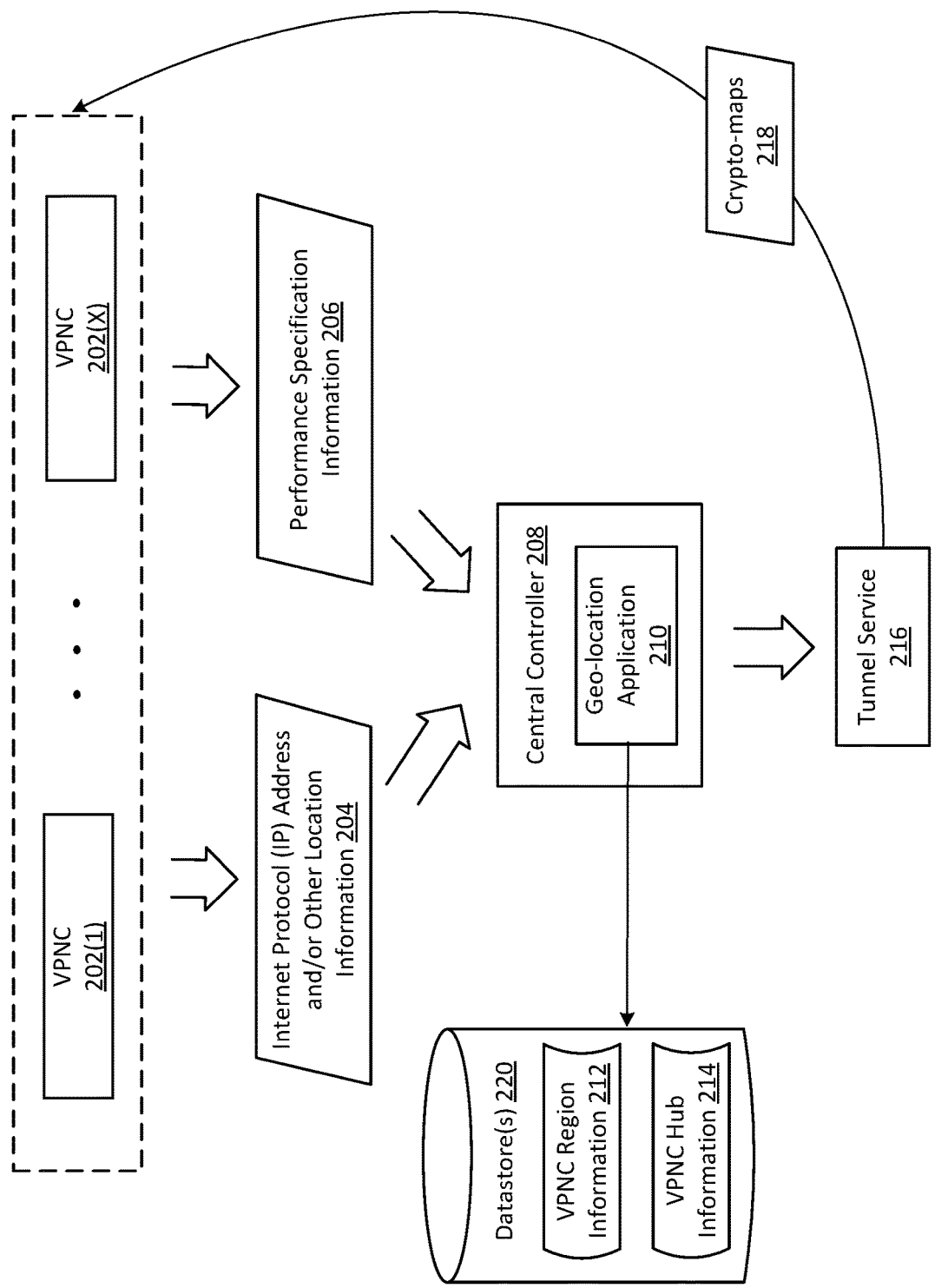
FIG. 2A is a schematic hybrid data flow and block diagram illustrating a process for establishing a geo-location based optimized hub mesh network according to example embodiments of the invention.
Figure 2B:
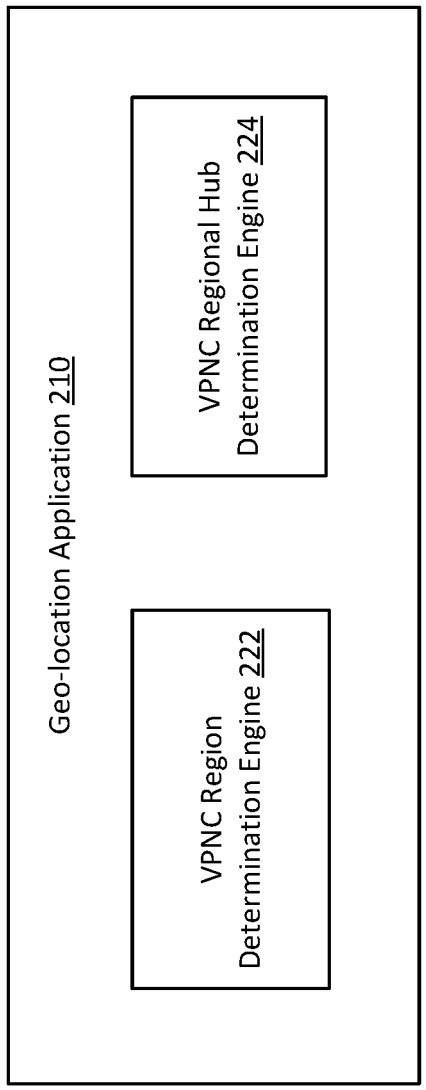
FIG. 2B depicts example computing engines configured to provide respective functionality in connection with establishing a geo-location based optimized hub mesh network according to example embodiments of the invention.
Figure 3:
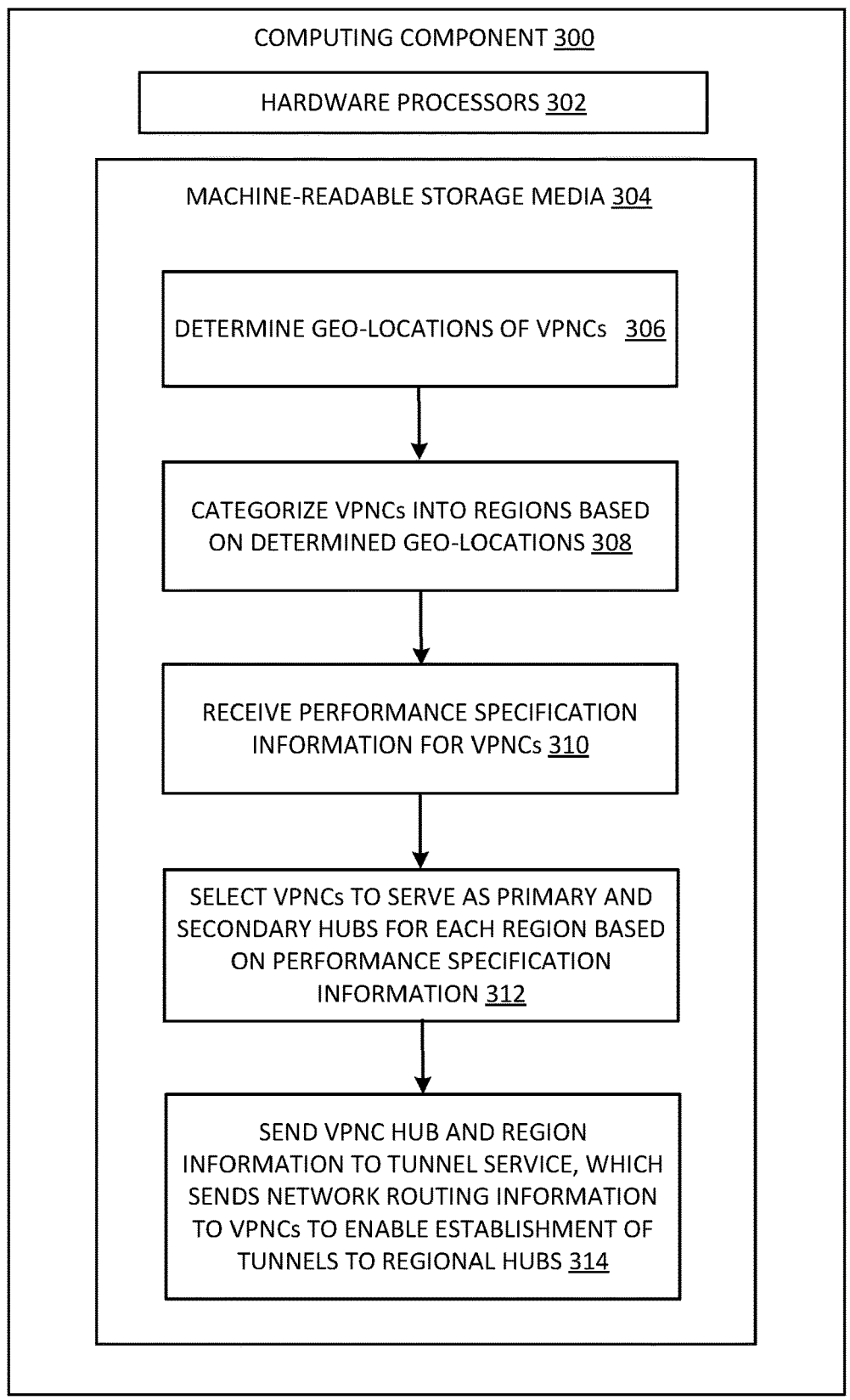
FIG. 3 depicts a set of executable instructions stored in machine-readable storage media that, when executed, cause an illustrative method to be performed for establishing a geo-location based optimized hub mesh network according to example embodiments of the invention.

FIG. 2A depicts a schematic hybrid data flow and block diagram illustrating a process for establishing a geo-location based optimized hub mesh network according to example embodiments of the invention. FIG. 2B depicts example computing engines configured to provide respective functionality in connection with establishing a geo-location based optimized hub mesh network according to example embodiments of the invention. FIG. 3 depicts a set of executable instructions stored in machine-readable storage media that, when executed, cause an illustrative method to be performed for establishing a geo-location based optimized hub mesh network according to example embodiments of the invention. FIG. 3 will be described hereinafter in conjunction with FIGS. 2A and 2B.

FIG. 3 depicts a computing component 300 that includes one or more hardware processors 302 and machine-readable storage media 304 storing a set of machine-readable/machine-executable instructions that, when executed, cause the hardware processors 302 to perform an illustrative method for establishing a geo-location based optimized hub mesh network according to example embodiments of the invention. The computing component 300 may be, for example, the computing system 500 depicted in FIG. 5. In some example embodiments, the computing component 300 may be an edge computing device such as a desktop computer; a laptop computer; a tablet computer/device; a smartphone; a personal digital assistant (PDA); a wearable computing device; a gaming console; another type of low-power edge device; or the like. In other example embodiments, the computing component 300 may be a server, a server cluster, or the like. The hardware processors 302 may include, for example, the processor(s) 504 depicted in FIG. 5 or any other processing unit described herein. The machine-readable storage media 304 may include the main memory 506, the read-only memory (ROM) 508, the storage 510, or any other suitable machine-readable storage media described herein.

In example embodiments, the instructions depicted in FIG. 3 as being stored on the machine-readable storage media 304 may be modularized into one or more computing engines such as those depicted in FIG. 2B. In particular, each such computing engine may include a set of machine-readable and machine-executable instructions, that when executed by the hardware processors 302, cause the hardware processors 302 to perform corresponding tasks/processing. In example embodiments, the set of tasks performed responsive to execution of the set of instructions forming a particular computing engine may be a set of specialized/customized tasks for effectuating a particular type/scope of processing.

In example embodiments, the hardware processors 302 (or any other processing unit described herein) are configured to execute the various computing engines depicted in FIG. 2B, which in turn, are configured to provide corresponding functionality in connection with establishing an optimized geo-location based hub mesh network. In particular, the hardware processors 302 may be configured to execute a VPNC region determination engine 222 and a VPNC regional hub determination engine 224. These engines can be implemented in any combination of hardware, software, and/or firmware. In some embodiments, one or more of these engines can be implemented, at least in part, as software and/or firmware modules that include computer-executable/machine-executable instructions that when executed by a processing circuit (e.g., the hardware processors 302) cause one or more operations to be performed. For example, these engines may form part of a geo-location application 210 configured to execute on a central controller 208 (FIG. 2A). In some example embodiments, these engines may be customized computer-executable logic implemented within a customized computing machine such as a customized field programmable gate array (FPGA) or an application specific integrated circuit (ASIC).

A system or device described herein as being configured to implement example embodiments of the invention (e.g., the computing device 500) can include one or more processing circuits, each of which can include one or more processing units or cores. These processing circuit(s) (e.g., the hardware processors 302, processor(s) 504) may be configured to execute computer-executable code/instructions of these various engines to cause input data contained in or referenced by the computer-executable program code/instructions to be accessed and processed by the processing unit(s)/core(s) to yield output data. It should be appreciated that any description herein of an engine performing a function inherently encompasses the function being performed responsive to computer-executable/machine-executable instructions of the engine being executed by a processing circuit.

Referring now to FIG. 3 in conjunction with FIGS. 2A and 2B, at block 306, machine-executable instructions of the VPNC region determination engine 222 may be executed by the hardware processors 302 to cause geo-locations of a group of VPNCs 202(1)-202(X) to be determined, where X is any integer greater than 1. In example embodiments, a geo-location application 210 executing on a central controller 208 may receive geo-location information 204 from the VPNCs 202(1)-202(X) in the form of IP addresses and/or other location information. In other example embodiments, the geo-location application 210 may retrieve the geo-location information 204 from a third-party service, from one or more datastores 220, or the like. In example embodiments, the geo-location information 204 may include, for example, an IP address for a VPNC, GPS coordinates indicative of a physical geographic location of an VPNC, a physical address of location at which a VPNC resides, or the like. In some example embodiments, the geo-location information 204 may include a combination of these different types of information. For instance, an IP address may be received for a first one or more of the VPNCs 202(1)-202(X); GPS coordinates may be received fora second one or more of the VPNCs 202(1)-202(X); and a physical address may be received for a third one or more of the VPNCs 202(1)-202(X).

At block 308, machine-executable instructions of the VPNC region determination engine 222 may be executed by the hardware processors 302 to cause the VPNCs 202(1)-202(X) to be categorized into different regions based on the geo-location information 204. For instance, the VPNC region determination engine 222 may determine that a first set of the VPNCs 202(1)-202(X) belong to a first region based on their corresponding IP addresses, GPS coordinates, physical addresses, other geographic identifiers, or the like; that a second set of the VPNCs 202(1)-202(X) belong to a second different region; and so forth. Once each VPNC is categorized into a respective region, VPNC region information 212 indicative of the region to which each VPNC belongs may be stored in the datastore(s) 220. Further, as new VPNCs are identified (e.g., brought online), geo-location information associated with the new VPNCs may be similarly used to determine which region each new VPNC belongs to, and the information 212 may be correspondingly updated.

At block 310, machine-executable instructions of the VPNC regional hub determination engine 224 may be executed by the hardware processors 302 to cause performance specification information 206 to be received for the VPNCs 202(1)-202(X). In example embodiments, the VPNC regional hub determination engine 224 executing as part of the geo-location application 210 on the central controller 208, or executing independently on the central controller 208 (or another network device) may receive the performance specification information 206 from the VPNCs 202(1)-202(X) or otherwise obtain the performance specification information 206. In example embodiments, the performance specification information 206 may include (for those VPNCs for which such information is available) model information including, for example, a model name and/or SKU details. In those cases where model information may not be available, or in addition to receiving the model information, the performance specification information 206 may include information identifying the type and/or amount of computing resources associated with a VPNC such as CPU type and speed, memory type and amount, platform type, and so forth. As will be described in more detail in relation to FIG. 4, the VPNC regional hub determination engine 224 may then calculate a performance rating/score for a VPNC based on the performance specification information 206.

Then, at block 312, machine-executable instructions of the VPNC regional hub determination engine 224 may be executed by the hardware processors 302 to cause a particular VPNC in each region to be selected as a primary regional hub for that region, and optionally, to cause another VPNC in each region to be selected as a secondary regional hub for that region. In the event of failure of the primary regional hub VPNC, the secondary regional hub VPNC may take over as the primary regional hub, and a new secondary regional hub may be selected. Information identifying which VPNCs have been selected as primary and secondary hubs for each region may be stored as information 214 in the datastore(s) 220.

At block 314, machine-executable instructions of the VPNC regional hub determination engine 224 may be executed by the hardware processors 302 to cause each VPNC within a given region to be informed of which VPNC has been selected as a regional hub for that region. In addition, the VPNCs in each region may receive network routing information (e.g., crypto-maps) to enable them to establish tunnel connections with the regional hub for their region as well as with other non-hub VPNCs within the same region. More specifically, the central controller 208 may communicate respective identifiers for the regional hub VPNCs to the tunnel service 216, which in turn, may communicate the necessary network routing information 218 (e.g., IPsec information including crypto-maps) to the various VPNCs 202(1)-202(X) to enable each non-hub VPNC in each region to establish a tunnel connection to the VPNC identified as the regional hub for that region as well as respective tunnel connections to each other VPNC in the same region. In addition, the regional hub VPNCs may utilize the information received from the tunnel service 216 to establish connections with one another. In this manner, an optimized geo-location based hub mesh network may be established. As previously noted, the optimized hub mesh network so formed does not require connections between a non-hub VPNC in any given region and any VPNC in any other region, thereby substantially reducing the number of connections that need to be established as compared to conventional hub mesh networks.

Figure 4:
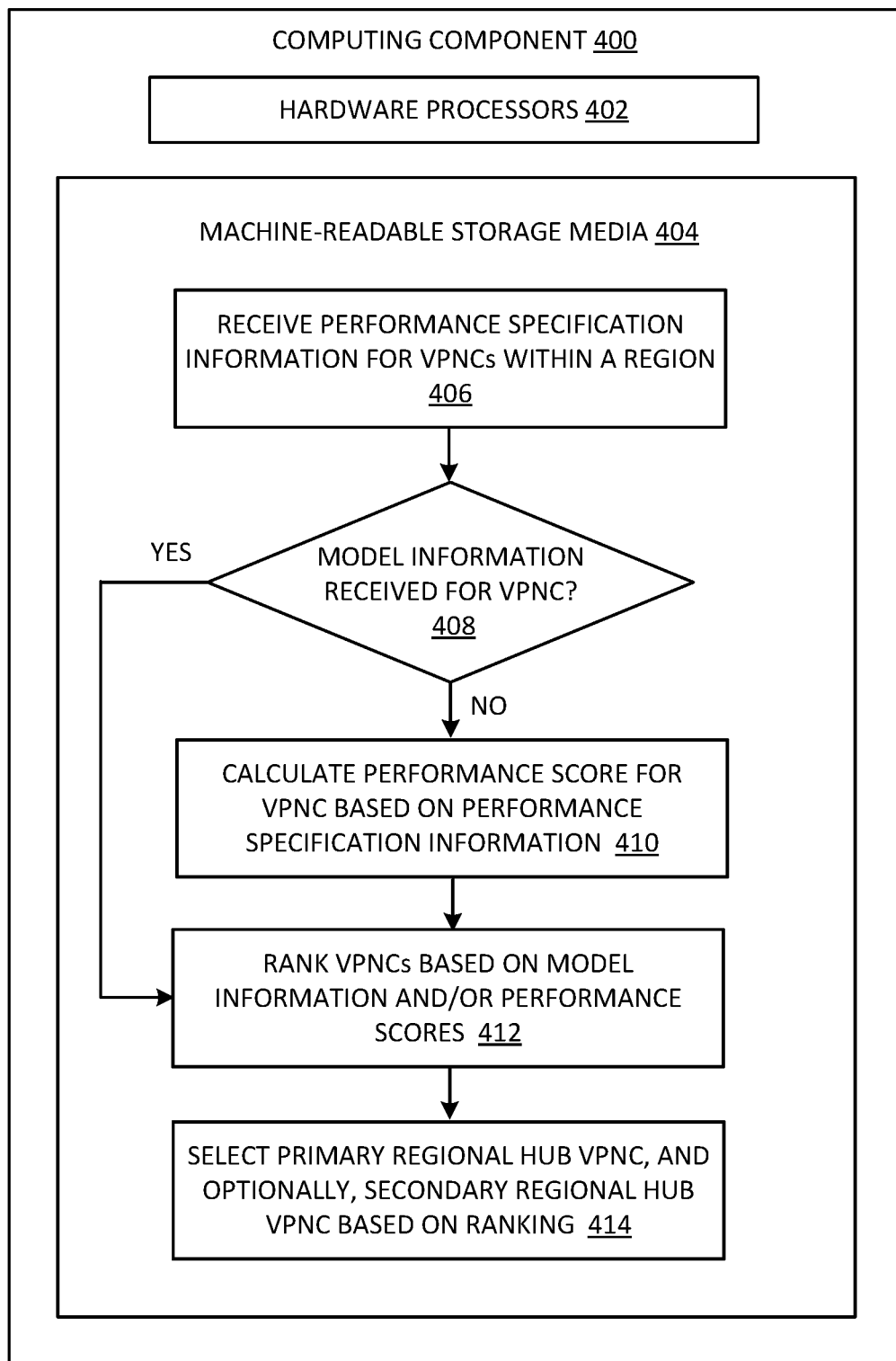
FIG. 4 depicts a set of executable instructions stored in machine-readable storage media that, when executed, cause an illustrative method to be performed for selecting a particular network controller to serve as a regional hub for a set of network controllers within a given region according to example embodiments of the invention.

FIG. 4 depicts a set of executable instructions stored in machine-readable storage media that, when executed, cause an illustrative method to be performed for selecting a particular network controller to serve as a regional hub for a set of network controllers within a given region according to example embodiments of the invention. The computing component 400 may include any of the types of computing components described earlier in reference to computing component 300. Similarly, the hardware processors 402 and the machine-readable storage media 404 may include of the types of hardware processors and machine-readable storage media described earlier in reference to hardware processors 302 and machine-readable storage media 304. The processing embodied by the set of executable instructions depicted in FIG. 4 may represent a specific implementation of the processing at blocks 310 and 312 of FIG. 3 and may be performed with respect to a given region of VPNCs. It should be appreciated that the processing of FIG. 4 may be performed with respect to each region of VPNCs.

At block 406, machine-executable instructions of the VPNC regional hub determination engine 224 may be executed by the hardware processors 402 to receive the performance specification information 206. As previously described, the performance specific information 206 may be received with respect to each VPNC in the region and may include different types of specification information for different VPNCs.

The processing at block 406 may be followed by the processing at block 408 and 410. The processing at blocks 408 and 410 may be performed iteratively with respect to each VPNC in the region. At block 408, machine-executable instructions of the VPNC regional hub determination engine 224 may be executed by the hardware processors 402 to determine whether model information has been received for a VPNC. If model information has been received, then in example embodiments, there is no need to calculate a performance score for the VPNC, but rather the model information can be directly evaluated as part of ranking the VPNCs. Thus, in response to a positive determination at block 408, the method may skip block 410 and proceed directly to block 412. In response to a negative determination at block 408, on the other hand, which indicates there is no model information for a VPNC (for example, the VPNC is a virtualized gateway that does not have an established model number or SKU), the method proceeds to block 410.

At block 410, machine-executable instructions of the VPNC regional hub determination engine 224 may be executed by the hardware processors 402 to cause a performance score to be calculated for the VPNC based on the performance specification information. In example embodiments, the performance score may be calculated by assigning various weights to different computing resources of the VPNC based on the type or amount of each such computing resource.

At block 412, machine-executable instructions of the VPNC regional hub determination engine 224 may be executed by the hardware processors 402 to rank the VPNCs in the region based on their model information and/or based on the performance scores calculated from their performance specification information.

Then, at block 414, machine-executable instructions of the VPNC regional hub determination engine 224 may be executed by the hardware processors 402 to cause a top-ranked VPNC to be selected as a primary regional hub for the region. Further, in some example embodiments, a next highest-ranked VPNC may be selected as a secondary regional hub, which assumes the role of the primary regional hub in the event that the current primary regional hub fails. Moreover, if a primary hub fails and the secondary regional hub now becomes the primary hub, a new secondary regional hub may be selected based on the ranking. Further, as new VPNCs are determined to have been added to a region, a re-ranking may be performed, and a new primary and/or secondary regional hub may be selected based on the re-ranking. In particular, if a new VPNC added to a region is associated with model information (e.g., a higher-ranked SKU) or a performance rating/score that is superior to a current primary regional hub or a current secondary regional hub, the new VPNC may replace the corresponding existing hub VPNC.

Figure 5:
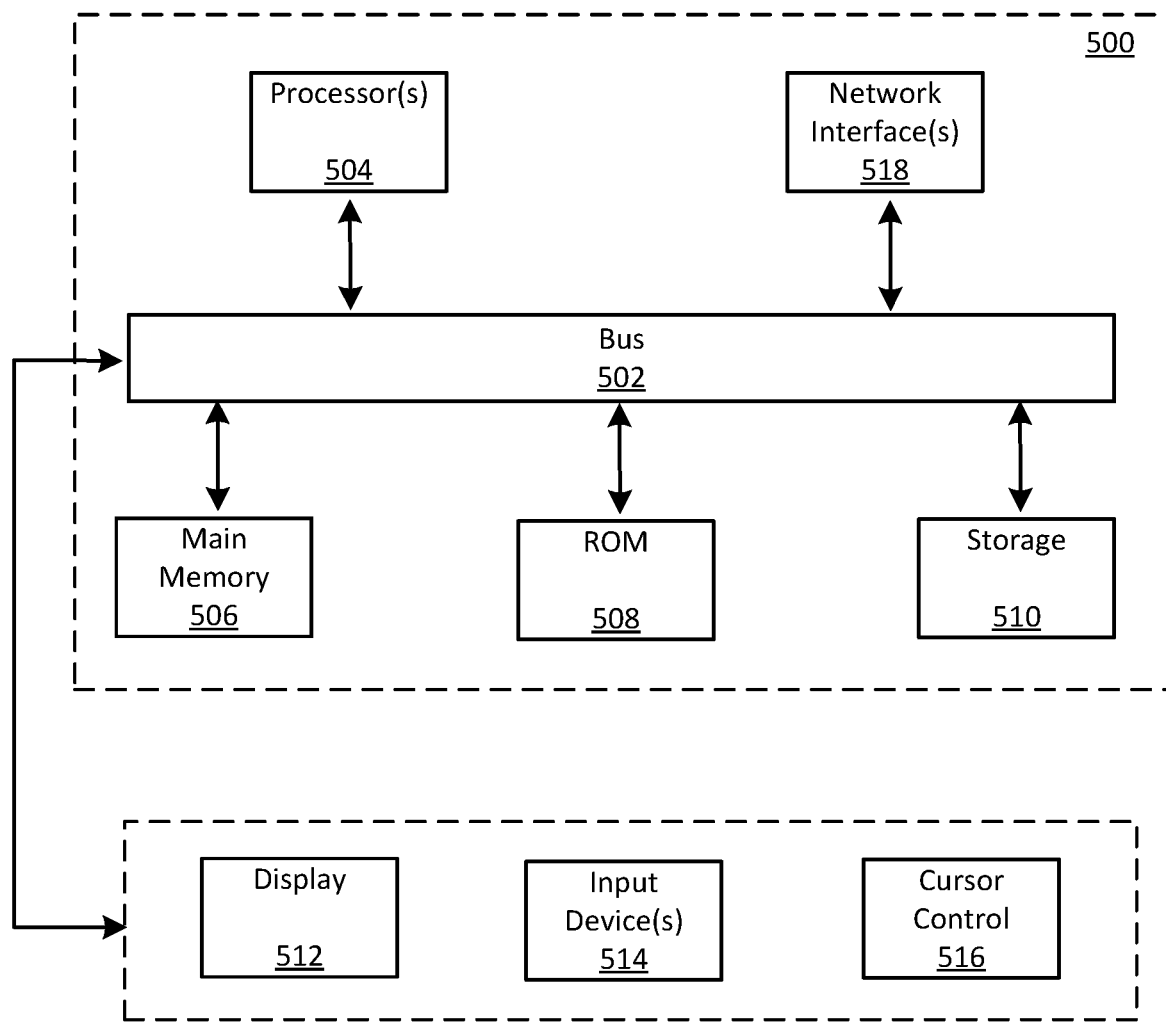
FIG. 5 is an example computing component that may be used to implement various features of example embodiments of the invention.

FIG. 5 depicts a block diagram of an example computer system 500 in which various of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a liquid crystal display (LCD) (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms such as machine-readable storage media, as used herein, refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

The computer system 500 also includes a communication interface 518 coupled to bus 502. Network interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, network interface 518 may be a local area network (LAN) card to provide a data communication connection to a compatible LAN (or WAN component to communicated with a WAN). Wireless links may also be implemented. In any such implementation, network interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 500.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method, comprising:
   determining a first set of geo-locations of a first plurality of network controllers;
   determining, based on the first set of geo-locations, that the first plurality of network controllers belong to a first region;
   obtaining performance specification information for the first plurality of network controllers;
   selecting a first network controller of the first plurality of network controllers to serve as a regional hub for the first region based on the performance specification information; and
   establishing a respective tunnel connection between the first network controller and each other network controller of the first plurality of network controllers, by sending an indication to a tunnel service that the first network controller has been selected as the regional hub, wherein the tunnel service is configured to send network routing information to the each other network controller to enable the each other network controller to establish the respective tunnel connections to the first network controller.

2. The method of claim 1, wherein the first plurality of network controllers comprises a plurality of virtual private network controllers (VPNCs).

3. The method of claim 1, wherein the first network controller is a primary regional hub, the method further comprising:
   selecting, based at least in part on the performance specification information, a second network controller of the first plurality of network controllers to serve as a secondary regional hub, wherein the secondary regional hub is configured to serve as the primary regional hub upon failure of the primary regional hub.

4. The method of claim 3, further comprising:
determining that the primary regional hub has failed;
assigning the secondary regional hub as the primary regional hub; and
selecting, based at least in part on the performance specification information, a new secondary regional hub.

5. The method of claim 1, wherein the performance specification is first performance specification information, the method further comprising:
determining a second set of geo-locations of a second plurality of network controllers;
determining, based on the second set of geo-locations, that the second plurality of network controllers belong to a second region;
obtaining second performance specification information for the second plurality of network controllers;
selecting a second network controller of the second plurality of network controllers to serve as a regional hub for the second region based on the second performance specification information; and
establishing a tunnel connection between the first network controller and the second network controller.

6. The method of claim 5, wherein respective tunnel connections are not established between any network controller in the first plurality of network controllers other than the first network controller and any network controller in the second plurality of network controllers.

7. The method of claim 1, wherein determining the first set of geo-locations of the first plurality of network controllers comprises determining at least one of an Internet Protocol (IP) address or physical geographic information for each network controller of the first plurality of network controllers.

8. The method of claim 1, wherein obtaining the performance specification information for the first plurality of network controllers comprises obtaining, for each network controller of the first plurality of network controllers, respective model information or information identifying one or more computing resources of the network controller.

9. The method of claim 8, wherein selecting the first network controller to serve as the regional hub for the first region comprises:
calculating a respective performance score for each of a first one or more network controllers of the first plurality of network controllers based on the information identifying one or more computing resources for each of the first one or more network controllers;
ranking the first plurality of network controllers based on i) the respective performance score for each of the first one or more network controllers and ii) the respective model information for each of a second one or more network controllers of the first plurality of network controllers; and
determining, based on the ranking, that a highest ranked network controller is the first network controller.

10. The method of claim 9, further comprising:
determining, based on a corresponding geo-location, that a new network controller has been added to the first region;
determining corresponding performance specification information for the new network controller;
re-ranking the first plurality of network controllers along with the new network controller based on the performance specification information for the first plurality of network controllers and the performance specification information corresponding to the new network controller; and
determining, based on the re-ranking, that the highest-ranked network controller is now the new network controller.

11. A system, comprising:
a memory storing machine-executable instructions; and
a processor configured to access the memory and execute the machine-executable instructions to:
determine a first set of geo-locations of a first plurality of network controllers;
determine, based on the first set of geo-locations, that the first plurality of network controllers belong to a first region;
obtain performance specification information for the first plurality of network controllers;
select a first network controller of the first plurality of network controllers to serve as a regional hub for the first region based on the performance specification information; and
establish a respective tunnel connection between the first network controller and each other network controller of the first plurality of network controllers, by sending an indication to a tunnel service that the first network controller has been selected as the regional hub, wherein the tunnel service is configured to send network routing information to the each other network controller to enable the each other network controller to establish the respective tunnel connections to the first network controller.

12. The system of claim 11, wherein the first plurality of network controllers comprises a plurality of virtual private network controllers (VPNCs).

13. The system of claim 11, wherein the first network controller is a primary regional hub, and wherein the at least one processor is configured to execute the computer-executable instructions to:
select, based at least in part on the performance specification information, a second network controller of the first plurality of network controllers to serve as a secondary regional hub, wherein the secondary regional hub is configured to serve as the primary regional hub upon failure of the primary regional hub.

14. The system of claim 13, wherein the at least one processor is configured to execute the computer-executable instructions to:
determine that the primary regional hub has failed;
assign the secondary regional hub as the primary regional hub; and
select, based at least in part on the performance specification information, a new secondary regional hub.

15. The system of claim 11, wherein the performance specification is first performance specification information, and wherein the at least one processor is configured to execute the computer-executable instructions to:
determine a second set of geo-locations of a second plurality of network controllers;
determine, based on the second set of geo-locations, that the second plurality of network controllers belong to a second region;
obtain second performance specification information for the second plurality of network controllers;
select a second network controller of the second plurality of network controllers to serve as a regional hub for the second region based on the second performance specification information; and establish a tunnel connection between the first network controller and the second network controller.

16. The system of claim 15, wherein respective tunnel connections are not established between any network controller in the first plurality of network controllers other than the first network controller and any network controller in the second plurality of network controllers.

17. The system of claim 11, wherein the at least one processor is configured to obtain the performance specification information for the first plurality of network controllers by executing the computer-executable instructions to obtain, for each network controller of the first plurality of network controllers, respective model information or information identifying one or more computing resources of the network controller, and wherein the at least one processor is configured to select the first network controller to serve as the regional hub for the first region by executing the computer-executable instructions to:
  calculate a respective performance score for each of a first one or more network controllers of the first plurality of network controllers based on the information identifying one or more computing resources for each of the first one or more network controllers;
  rank the first plurality of network controllers based on i) the respective performance score for each of the first one or more network controllers and ii) the respective model information for each of a second one or more network controllers of the first plurality of network controllers; and
  determine, based on the ranking, that a highest ranked network controller is the first network controller.

18. A computer program product comprising a non-transitory computer readable medium storing program instructions that, when executed by a processor, cause operations to be performed comprising:
  determining a first set of geo-locations of a first plurality of network controllers;
  determining, based on the first set of geo-locations, that the first plurality of network controllers belong to a first region;
  obtaining performance specification information for the first plurality of network controllers;
  selecting a first network controller of the first plurality of network controllers to serve as a regional hub for the first region based on the performance specification information; and
  establishing a respective tunnel connection between the first network controller and each other network controller of the first plurality of network controllers, by sending an indication to a tunnel service that the first network controller has been selected as the regional hub, wherein the tunnel service is configured to send network routing information to the each other network controller to enable the each other network controller to establish the respective tunnel connections to the first network controller.

19. The computer program product of claim 18, wherein obtaining the performance specification information for the first plurality of network controllers comprises obtaining, for each network controller of the first plurality of network controllers, respective model information or information identifying one or more computing resources of the network controller.

20. The computer program product of claim 19, wherein selecting the first network controller to serve as the regional hub for the first region comprises:
  calculating a respective performance score for each of a first one or more network controllers of the first plurality of network controllers based on the information identifying one or more computing resources for each of the first one or more network controllers;
  ranking the first plurality of network controllers based on i) the respective performance score for each of the first one or more network controllers and ii) the respective model information for each of a second one or more network controllers of the first plurality of network controllers; and
  determining, based on the ranking, that a highest ranked network controller is the first network controller.

* * * * *